United States Patent [19]

Maezawa et al.

[11] Patent Number: 4,776,224

[45] Date of Patent: Oct. 11, 1988

[54] PLANETARY GEAR TYPE REDUCTION STARTER

[75] Inventors: Koichi Maezawa; Yozo Nakamura, both of Ibaraki; Naoyuki Tanaka, Abiko; Fumiaki Kasubuchi, Katsuta, all of Japan

[73] Assignee: Hitachi, Ltd., Tokyo, Japan

[21] Appl. No.: 790,477

[22] Filed: Oct. 23, 1985

[30] Foreign Application Priority Data

Oct. 24, 1984 [JP] Japan ............................... 59-222024

[51] Int. Cl.[4] ........................ F16H 55/00; F02N 11/00

[52] U.S. Cl. ........................................... 74/7 E; 74/6; 74/7 R; 74/462; 74/457

[58] Field of Search ................. 74/785, 7 E, 457, 462, 74/797, 801, 788, 440, 460, 437, 457; 29/159.2; 474/161

[56] References Cited

U.S. PATENT DOCUMENTS

| | | | |
|---|---|---|---|
| 820,789 | 5/1906 | Hutchins | 74/460 |
| 1,485,158 | 2/1924 | Babson . | |
| 1,814,825 | 7/1931 | Cameron . | |
| 2,248,240 | 7/1941 | King | 74/785 |
| 2,756,607 | 7/1956 | Mochel . | |
| 2,956,451 | 10/1960 | Bowman . | |
| 3,081,648 | 3/1963 | Duer | 74/460 |
| 3,188,888 | 6/1965 | Zink et al. | 74/410 |
| 4,173,906 | 11/1979 | Altenbokum et al. | 74/410 |
| 4,503,719 | 3/1985 | Hamano | 74/411 X |
| 4,590,811 | 5/1986 | Kasubuchi | 74/7 E |

FOREIGN PATENT DOCUMENTS

| | | | |
|---|---|---|---|
| 098992 | 1/1984 | European Pat. Off. . | |
| 572107 | 9/1945 | United Kingdom | 74/438 |
| 964675 | 5/1963 | United Kingdom . | |
| 2109471 | 10/1982 | United Kingdom . | |
| 2109893 | 10/1982 | United Kingdom . | |

*Primary Examiner*—Randolph A. Reese
*Assistant Examiner*—Anthony Knight
*Attorney, Agent, or Firm*—Antonelli, Terry & Wands

[57] ABSTRACT

A reduction starter employing a planetary gear type reduction gear mechanism having an outer ring gear displaceable radially of a common axis of a central sun gear and an output shaft carrying planet gears for revolution about the common axis. The outer ring gear is formed by an internally toothed ring gear elastically deformable to assure uniform distribution of load torque to all planet gears. The tooth root bending stress of the ring gear is substantially equalized to the outer periphery bending stress thereof to improve the load performance of the planetary gear type reduction gear mechanism and thus reduce the size and weight of the starter. The outer ring gear has an outer rim of a radial thickness t and a plurality of radially inwardly extending teeth each having a height h. The rim thickness t is determined to'fall with a range of from $+\leqq 0.8$ h to $+\geqq 0.4$ h.

1 Claim, 5 Drawing Sheets

10

PLANETARY GEAR TYPE REDUCTION STARTER

CROSS-REFERENCE TO RELATED APPLICATION

The present invention is related to commonly assigned U.S. application No. 615,523, now U.S. Pat. No. 4,590,811, the disclosure of which is incorporated herein by reference.

BACKGROUND OF THE INVENTION

The present invention relates to a reduction starter having a planetary gear type reduction mechanism disposed between a starter motor and a pinion and now particularly, to a planetary gear type reduction starter for internal combustion engines.

Recently, there has been a demand to provide automotive vehicles with driving systems of lightweight and compact design, such as F.F. (front engine—front wheel drive) type driving system, to improve the fuel consumption rate and the riding comfort of the vehicles, with such demand also being raised with regard to engine starters. In view of these demands, a planetary gear type reduction starter have been proposed in U.K. Patent Specification No. 964,675 as a substitution for the conventional engine starter having a parallel shaft type reduction gear mechanism in which the axis of the motor shaft is parallel to and spaced from the axis of the output pinion shaft. With the planetary gear type reduction mechanism, it is possible to arrange the pinion shaft coaxially with the motor shaft, so that the size of the reduction mechanism can be considerably reduced.

In the planetary gear type reduction starter, a plurality of planet gears are disposed in an annular space between a sun gear and an outer ring gear at circumferentially equal intervals. If the load cannot be distributed equally or uniformly to all of the planet gears, an unduly increased load is applied to only some of the planet gears thereby disadvantageously decreasing the load capacity or performance of the planetary gear reduction mechanism and increasing in vibration and noise levels. In order to avoid such problems, the gears of the planetary gear type reduction mechanism must be fabricated and assembled with a high precision which, however, increases the manufacturing cost.

In order to attain a uniform distribution of load to all of the planet gears, it has been attempted to fabricate more than one of the gears of a planetary gear mechanism from a resilient or flexible material. It has also been attempted to resiliently support either one of the gears of a planetary gear mechanism.

As the former attempt, an internally toothed outer ring gear of the planetary gear mechanism has been designed to have a decreased radial thickness of the rim section of the ring gear. However, due to the concerns regarding the reduction of the mechanical strength of the ring gear, the rim thickness of the ring gear was not decreased sufficiently to attain a good distribution of load to all of the planet gears.

It is an object of the present invention to provide a planetary gear type reduction starter with an improved load performance of the planetary gear mechanism.

It is another object of the present invention to provide a starter with reduced vibration and noise levels.

It is a further object of the present invention to provide a starter which can be manufactured at a reduced cost.

The reduction starter according to the present invention comprises a starter motor; a planetary gear reduction mechanism including a sun gear driven by the starter motor, an internally toothed outer ring gear locked against rotation and a plurality of planet gears disposed in meshing engagement with the sun gear and the outer ring gear and mounted for revolution about the axis of the sun gear; and means for transmitting the revolution of the planet gears to a crank shaft of an associated internal combustion engine. The outer ring gear includes an outer rim section having a radial thickness t and a plurality of radially inwardly extending gear teeth each having a height h. The rim thickness t is determined to fall within the range of from $$t \leqq 0.8h$$

to $$t \geqq 0.4h.$$

As will be seen from the above, the thickness of the rim section of the outer ring gear is less than the radial height of each of the radially inwardly extending gear teeth of the ring gear. Thus, the rim section is flexible or elastically deformable to improve the uniformity of the distribution of the load torque to all of the planet gears, which improves the load performance of the planetary gear type reduction mechanism. Due to the deformable design of the outer ring gear, the stress produced by the load torque in the root of each gear tooth is substantially equalized to the bending stress produced in the outer periphery of the ring gear at a point substantially radially outward of the loaded gear tooth, whereby the allowable load torque of the ring gear can be increased to contribute to the reduction in the size and weight of the starter. The improved load distribution assures a well balanced operation of the planetary gear reduction mechanism with resultant improvement in the efficiency of the starter operation and reduction in the noise and vibration produced. Moreover, the flexibility of the rim of the outer sun gear is opreative to absorb offsets of component parts of the planetary gear reduction mechanism from correct positions caused due to less precise mounting. In other words, the deformable nature of the outer ring gear is effective to render the planetary gear mechanism insensitive to precision of fabrication of the gears and of mounting thereof to thereby assure reduction in the cost of manufacture of the planetary gear reduction mechanism and thus of the reduction starter.

The above and other objects, features and advantages of the present invention will be become more apparent from the following description when taken in connection with the accompanying drawings.

DETAILED DESCRIPTION

Figure 1:
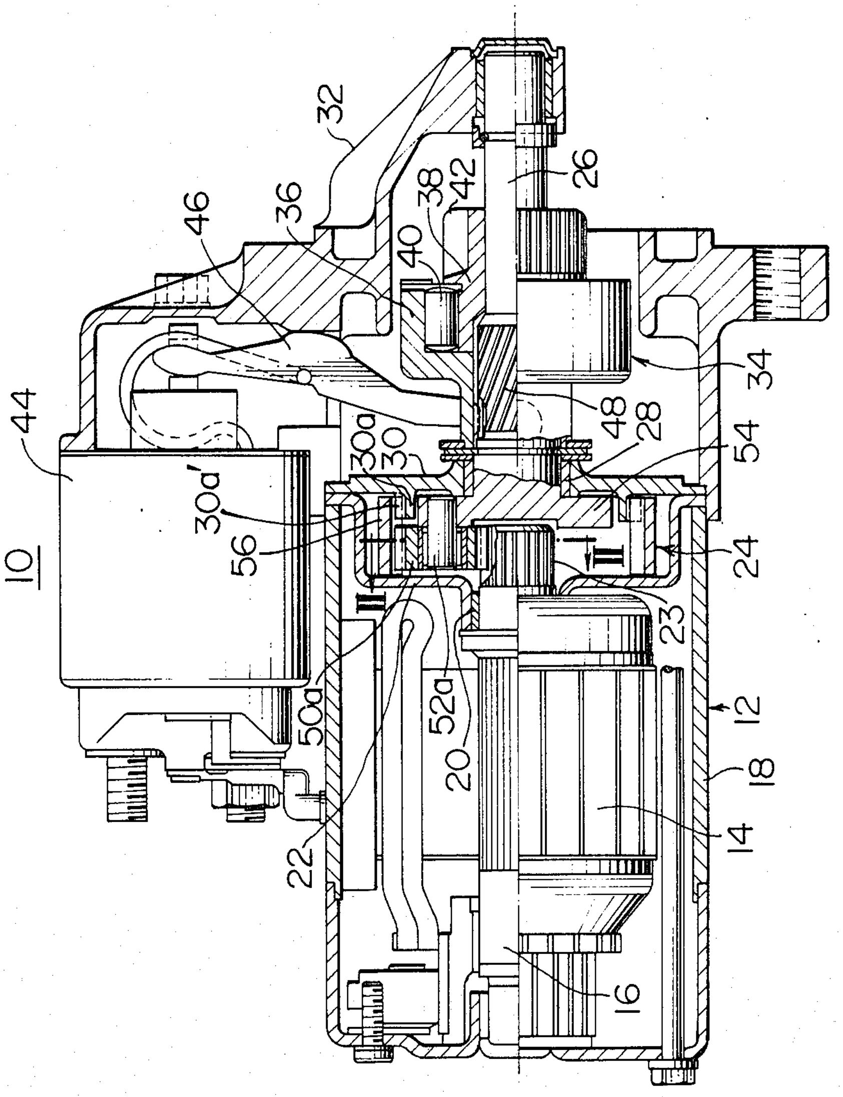
FIG. 1 is an axial sectional view of a preferred embodiment of the planetary gear type reduction starter according to the present invention.
Figure 2:
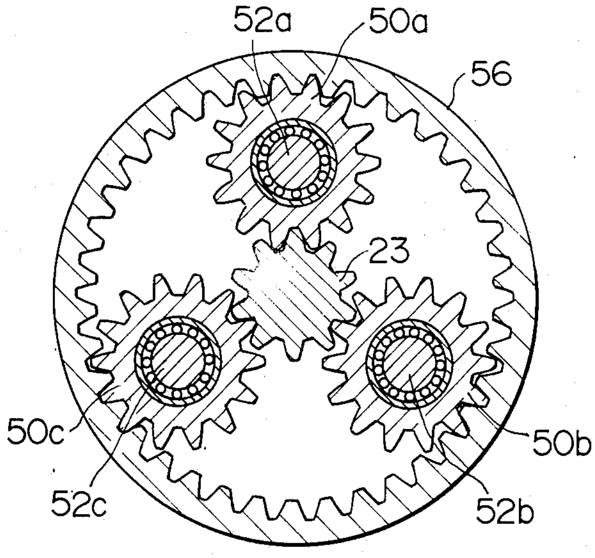
FIG. 2 is an enlarged cross-section of the planetary gear mechanism of the starter taken along line II—II in FIG. 1.

Referring now to the drawings when like reference numerals are used throughout the various views to designate like parts and, more particularly, to FIGS. 1 and 2 according to these figures a starter 10 includes a starter motor 12 having an armature 14 mounted on an armature shaft 16 for rotation therewith. The armature shaft 16 has an outer end portion rotatably supported by a bearing mounted on an outer end of a motor housing 18. The shaft 16 is also rotatably supported at a portion adjacent to the other or inner end thereof by a second bearing 20 mounted on a generally cup-shaped center bracket 22 having an outer periphery secured to the other or inner end of the motor housing 18. The inner end portion of the armature shaft 16 is shaped into a pinion 23 forming a sun gear of a planetary gear type reduction mechanism 24 described more fully hereinbelow and is operative to transmit the rotation of the armature shaft 16 to an output shaft 26 which is coaxial with the armature shaft 16 and has an inner end portion rotatably supported by a third bearing 28 mounted on a generally annular second center bracket 30 having an outer periphery secured to the inner end of the motor housing 18 together with the first center bracket 22. The other end of the output shaft 26 is rotatably supported by a frame 32 of the starter. A one-way clutch 34 is mounted on the output shaft 26 for axial movement within a limited range. The clutch 34 includes an outer clutch member 36 mounted on the output shaft 26 for rotation therewith, an inner clutch member 38 mounted on the output shaft 26 for rotation relative to the output shaft 26 and to the outer clutch member 36, and intermediate clutch rollers 40 only one of which is shown in the drawings. The inner clutch member 38 has an integral pinion 42 adapted to be brought into meshing engagement with a ring gear (not shown) of an internal combustion engine.

The starter 10 is also provided with a magnet switch 44 and a lever 46. When the magnetic switch 44 is actuated, the lever 46 is operated to move the clutch 34 in axial and rotational directions along a helical spline 48 formed on the output shaft 26 so that the pinion 42 is also moved in rotational and axial directions into meshing engagement with the engine ring gear. The clutch 34, the magnet switch 44 and the lever 46 are of a conventional construction.

The planetary gear type reduction mechanism 24 is housed in a generally circular chamber defined by the cooperation of the two center brackets 22 and 30. As shown in FIG. 2, the reduction mechanism 24 includes three planet gears **50*a*–50*c* circumferentially spaced at equal intervals and disposed in meshing engagement with the sun gear 23 which is integral with the armature shaft 16, as described previously. The planet gears 50*a*–50*c* are rotatably mounted on planet pins 52*a*–52*c* fixed at one end to a planet gear carrier 54 which is integral with the end of the output shaft 26 which extends inwardly through the bearing 28 mounted on the second center bracket 30. The planet gears 50*a*–50*c* are also in meshing engagement with internal gear teeth of an outer ring gear 56 which is coaxial with the sun gear 23 and disposed in the chamber defined by the two center brakets 22 and 30. The second center bracket 30 has an integral annular projection 30*a* which is coaxial with the output shaft 26 and extends into the chamber defined between the two brackets 22 and 30. The annular projection 30*a* has external gear teeth 30*a*' formed on the outer peripheral surface of the annular projection. The gear teeth 30*a*' are in meshing engagement with the internal gear teeth of the outer ring gear 56 with a slight back lash so that the ring gear 56 is locked against rotation. For this purpose, the outer ring gear 56 has an axial dimension slightly greater than the total of the axial dimensions of the externally toothed annular projection 30*a* and each of the planet gears 50*a*–50*c*. The outer ring gear 56 is not secured to any of the two center brackets 22 and 30. In addition, the meshing engagement between the outer ring gear 56 and the externally toothed annular projection 30*a* is so loose that the ring gear 56** is radially displaceable within a limited range, as described in more detail in the above-noted U.S. Pat. No. 4,590,811.

With the above structure and arrangement of the planetary gear type reduction mechanism 24, the rotation of the armature shaft 16 and, thus, of the sun gear 23, causes the planet gears **50*a*–50*c* to revolve about the axis of the output shaft 26 and, at the same time, rotate about their own axes, i.e., about the planet pins 52*a*–52*c*, because the outer ring gear 56 is held against rotation whereby the planetary gear type reduction mechanism 24 transmits the rotation of the armature shaft 16 to the output shaft 26** at a reduced speed.

The internally toothed outer ring gear 56 is fabricated by severing or slicing a length of an internally toothed cylindrical blank of a carbon steel for mechanical structure. The cylindrical steel blank is prepared by cold working and, more particularly, plastic deformation or working. Thus, the internally toothed outer ring gear 56 does not have a discontinuous molecular structure at the corner between each tooth flank and the adjacent bottom of space as is formed in the case where gear teeth are formed by machining, so that the ring gear 56 has an allowable stress which is greater than that obtained when the gear is produced by machining.

Figure 3:
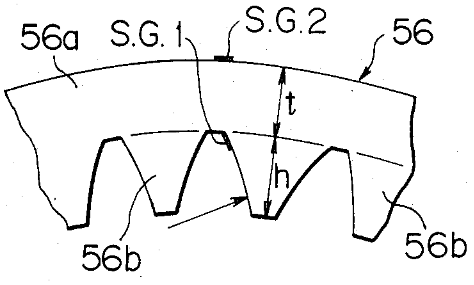
FIG. 3 is an enlarged fragmentary sectional view of the outer ring gear of the planetary gear mechanism showing the shapes of the internal gear teeth of the ring gear.

Referring to FIG. 3, the outer ring gear 56 has an outer rim section **56*a*** of a radial thickness t and a plurality of radially inwardly extending gear teeth each having a height (radial dimension) h.

Tests have been conducted to determine appropriate rim thickness t relative to the gear tooth height h. For this purpose, internally toothed ring gears were prepared which had various ratios of the rim thickness t relative to the tooth height h. A first set of three strain gauges S.B.1 (only one of which is shown in the drawings) were applied each to the corner between the tooth flank of a tooth of each ring gear and the adjacent bottom land, as shown in FIG. 3. Because three planet gears 50a–50c are employed in the embodiment of the invention and circumferentially equally spaced from each other, the three strain gauges S.G. 1 were applied to the ring gear 56 at three circumferentially equally spaced points. Similarly, a second set of three strain gauges (only one of which is shown in the drawings) were applied to three circumferentially spaced points on the outer peripheral surface of each of the ring gears tested. The three points on the outer peripheral surface of the ring gear were positioned substantially radially outward of the first set of three strain gauges S.G. 1, respectively. Three planet gears were disposed in meshing engagement with the internal teeth of each of the ring gears tested and the planet gears were driven while the outer ring gear was kept stationary by applying a braking force. The first set of three strain gauges S.G. 1 were used to measure the stresses produced in the roots of the circumferentially equally spaced three teeth by the load applied by the driven planet gears. The load applied is indicated by an arrow shown in FIG. 3. The second set of three strain gauges S.G. 2 were used to measure the bending stresses produced by the load in the outer periphery of the ring gear.

The results of the tests and the determination of appropriate rim thickness t relative to the tooth height h will be described with reference to FIGS. 4 through 8.

Figure 4:
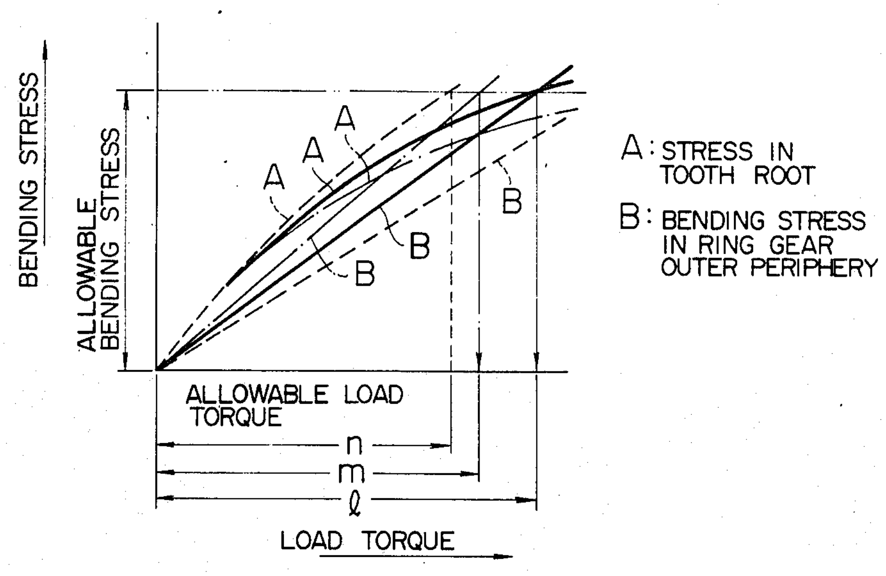
FIG. 4 is a graphical illustration of the results of experimental tests on a planetary gear reduction mechanism concerning the load torque relative to the bending stress and also concerning the allowable load torque relative to the allowable bending stress.

Referring first to FIG. 4, the abscissa indicates the load torque while the ordinatre indicates the bending stress. The internally toothed ring gears tested were made from the afore-mentioned carbon steel. Each of the lines shown respresents a mean value of the stresses measured at the three points of each of the ring gears. The broken lines represent the test results from the gear having a relatively large rim thickness t equal to the tooth height t (i.e., t=h). The solid lines represent the test results from a ring gear having a rim thickness t equal to 0.8h (i.e., t=0.8h), whereas, the one-dot lines indicate the test results from a ring gear having a rim thickness t equal to 0.4h (t=0.4h). The curves indicated by A show the stresses in the roots of the gear teeth of the gears tested while the curves indicated by B show the bending stresses in the outer peripheries of the gears.

It will be seen in FIG. 4 that the bending stresses in the outer peripheries of the gears are increased as the load torque is increased. In the case where the rim thickness t is equal to 0.8h (indicated by solid line curves), the solid line B showing the outer periphery bending stress is disposed above the broken line B which shows the outer periphery bending stress in the case of the rim thickness t equal to the tooth height h (t=h). It will be also seen that the solid line A showing the tooth root stress in the case of the rim thickness t equal to 0.8h (t=0.8h) is positioned below the broken line B which shows the tooth root stress in the case of the rim thickness t equal to the tooth height h (t=h). In the case where the rim thickness t is equal to 0.4h (shown in one-dot lines), the one-dot line B (outer periphery bending stress) is positioned above the solid line B (t=0.8h) and the one-dot line A (tooth root stress) is below the solid line A (t=0.8h). As apparent from FIG. 4, the decrease in the rim thickness renders the rim elastically deformable or flexible so that the stresses in the gear teeth and in the rim sections of the gears are correspondingly decreased.

Assuming that the upper limit of the allowable bending stress of the carbon steel from which the interally toothed outer ring gear 56 is formed is the value indicated by the two-dot line in FIG. 4, the allowable load torques in the cases of the rim thickness t equal to 0.8h, 0.4h and h are determined to be l, m and n, respectively, as will be seen in FIG. 4. In the case of the rim thickness t equal to tooth height h, therefore, the allowable load torque related to the bending stress in the outer periphery of the ring gear is relatively large but the allowable load torque related to the tooth root bending stress is small. The allowable load torque (n) of the gear having the rim thickness t equal to the tooth height h is, therefore, determined by the small allowable load torque. In the case of the rim thickness t equal to 0.4h, the allowable load torque (m) related to the tooth root bending stress is relatively large but the allowable load torque related to the bending stress in the ring gear outer periphery is relatively small. The allowable load torque (m) of the ring gear having the rim thickness t equal to 0.4h, therefore, is determined by the small allowable load torque. This small allowable load torque, however, is large enough to meet with the requirement for the allowable torque transmission capacity of the outer ring gear of an engine starter. In the case where the rim thickness t is equal to 0.8h, the tooth root bending stress and the ring gear outer periphery bending stress are equal to the allowable stress of the material from which the ring gear is formed. Thus, the allowable load torque (l) of the ring gear having the rim thickness t equal to 0.8h is greater than the allowable load torque (n) in the case of the rim thickness t equal to h and also than the allowable load torque (m) in the case of the rim thickness t equal to 0.4h.

Figure 5:
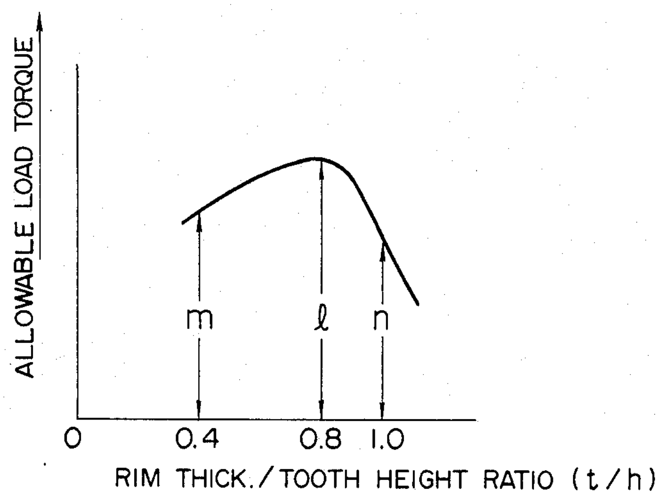
FIG. 5 is a graphical illustration of results experimental test concerning the allowable load torque relative to the ratio of the rim thickness relative to the tooth height.

FIG. 5 shows the allowable load torque reltive to the ratio of the rim thickness t to the tooth height h, namely, the ratio t/h. It will be seen in FIG. 5 that the largest allowable load torque l is obtained in the case where the rim thickness t is equal to 0.8h and that the allowable load torque is rapidly lowered in the region where the rim thickness t is greater than the tooth height h.

Figure 6:
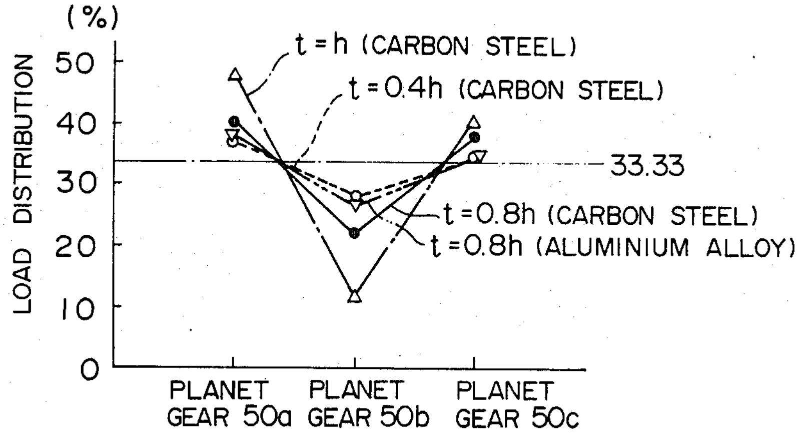
FIG. 6 is a graphical illustration of results of tests on the load distribution to the planet gears.

FIG. 6 shows the distribution of the load to the three planet gears 50a–50c. The distributed loads were obtained from the tooth root stresses measured by the three strain gauges S.G. 1. The relationship between the tooth root stress and the distributed load was previously known from examinations conducted in advance. The ring gears tested were made from the afore-mentioned carbon steel for mechanical structure and also from a high strength aluminium alloy. The load distribution shown in the ordiante of the graph shown in FIG. 6 was obtained from the following equation:

$$\text{Load distribution} = \frac{\text{Load distributed to each planet gear}}{\text{Total of loads distributed to all planet gears}} \times 100\ (\%)$$

Because the embodiment shown in FIGS. 1 and 2 has three planet gears 50a–50c, the optimum load distribution to each planet gear is 33.33%. As will be seen in FIG. 6, the maximum load distribution (namely, the maximum load distributed to one of the three planet gears) in the case of the steel gears was 48% with the rim thickness t being equal to the tooth height h, 40% with the rim thickness t being equal to 0.8h, and 37% with the rim thickness t being equal to 0.4h. In the case of the aluminium alloy gears, the maximum load distribution was 38% with the rim thickness t being equal to 0.8h.

Figure 7:
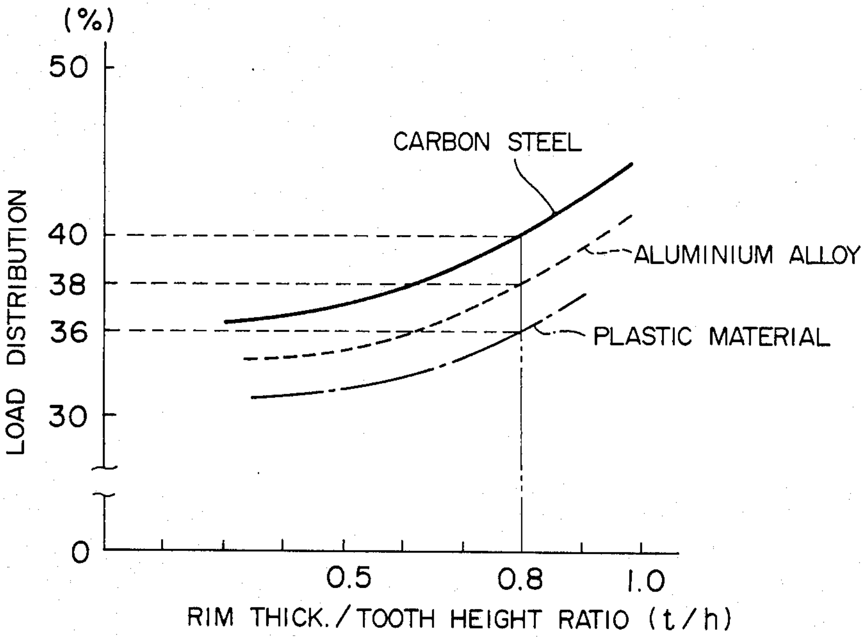
FIG. 7 is a graphical illustration of the results of tests on the planetary gear type reduction starter shown in FIG. 1 concerning the allowable load torque relative to the load distribution.

FIG. 7 shows the maximum load distributions relative to the ratio t/h. The maximum load distributions were obtained from internally toothed ring gears made from carbon steel (shown by the solid line curve), from aluminium alloy (shown by broken line curve) and from a plastic material reinforced by carbon or glass fibers (shown by one-dot line curve). It will be appreciated that the load distribution to the three planet gears becomes more uniform or equal as the ratio t/h is decreased from 1.0.

Figure 8:
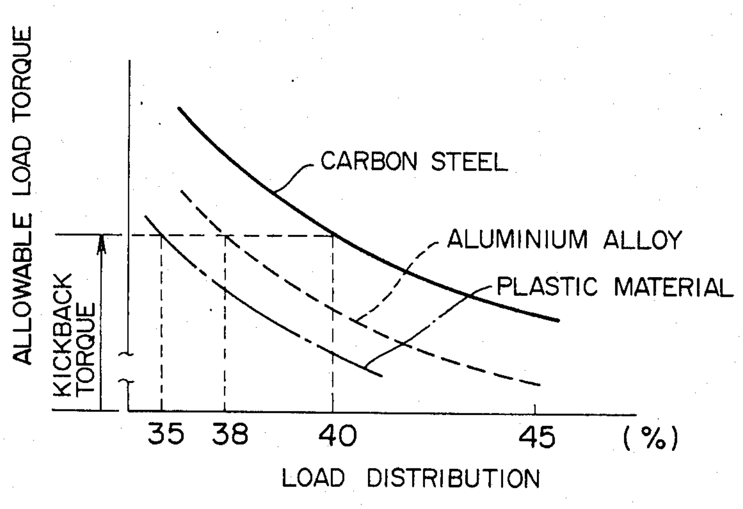
FIG. 8 is a graph which illustrates allowable load torques for three different materials relative to lead distribution.

FIG. 8 shows the allowable load torque (shown in ordinate) relative to the load distribution (shown in obscissa). The allowable load torque shown is for the embodiment of the planetary gear type reduction starter of the invention shown in FIG. 1. The solid line curve, the broken line curve and the one-dot line curve shown in FIG. 8 respectively represent the test results from the carbon steel gears, from the aluminium alloy gears and from the fiber-reinforced plastic gears. It will be seen that, for the same torque to be transmitted, the lower the strength of the material is, the more uniform the load distribution should be.

The allowable load torque shown in FIG. 8 was determined to be of the magnitude of the torque with which the internal gear teeth of the outer ring gear of the planetary gear type reduction starter encounters when the pinion 42 of the starter 10 is accidentally engaged with and impacted by the ring gear of the engine at the time of kickback thereof. It will be appreciated that, in order to meet with the requirement for the allowable load torque shown in FIG. 8, the load distribution should be not more than 40% in the case of the steel ring gear and not more than 38% in the case of the aluminium alloy ring gear. Considering the load distribution relative to the t/h ratio shown in FIG. 7, the t/h ratio which satisfies the requirements for the load distributions in the respective cases discussed is determined to be not greater than 0.8.

Accordingly, an internally toothed outer ring gear having a rim thickness t equal to or less than 0.8h provides an improved distribution of load to all the planet gears, has a satisfactory mechanical strength, increases the load performance of the planetary gear type reduction mechanism and, therefore, contributes to the reduction in the size and weight of the engine starter.

It is to be understood that the dimensions of internally toothed ring gears shown in specifications always include manufacturing tolerances and, accordingly, the t/h ratio of 0.8 discussed above is not the value obtained from the dimensions shown on design drawings without manufacturing tolerances but rather the value obtainable from the actual dimensions of gears already fabricated.

Plastic materials have bending strengths lower than those of the carbon steels. Thus, the allowable torque of the plastic ring gear is smaller than that of the carbon steel ring gear. For the same allowable load torque, therefore, the plastic ring gear cannot withstand the load unless it has a load distribution better than that of the carbon steel ring gear. The maximum load distribution of the plastic ring gear is determined to be 36% (see the one-dot line curve in FIG. 7).

On the other hand, plastic materials are more flexible than the carbon steels. Thus, the plastic ring gear having a rim thickness greater than that of the carbon steel ring gear provides a load distribution better than that of the carbon steel ring gear. In order that the plastic ring gear may provide the load distribution of 36%, the t/h ratio of the plastic gear is determined to be sbstantially 0.8 (see the one-dot line curve in FIG. 7).

As apparent from the foregoing description that, in order to obtain well balanced mechanical strengths and flexibilities of internally toothed outer ring gears fabricated from a variety of materials, the ratio of the rim thickness t to the tooth height h should fall with the range of from 0.8 to 0.4.

What is claimed is:

1. A reduction starter including a starter motor having an armature shaft and a reduction gear mechanism having a sun gear fixed to an end of said armature shaft and an output shaft disposed coaxially with said sun gear, said reduction gear mechanism being formed by a planetary gear mechanism comprising said sun gear, planet gears mounted for rotation about the axis of said sun gear and drivingly connected to said output shaft, and an internally toothed outer ring mounted for displacement within a limited range in directions substantially perpendicular to the common axis of said input and output shafts, said outer ring gear including an outer rim section having a radial thickness t and a plurality of radially inwardly extending gear teeth each having a height h, said radial thickness t being within the range of from: $t<0.8h$ to $t>0.4h$, and wherein said internally toothed outer ring gear is fabricated from an internally toothed cold work cylindrical blank of a carbon steel, further including a pinion carried by said output shaft and a center bracket rotatably supporting said output shaft, said center bracket includes an annular gear formed on and projecting from one side of said center bracket, and wherein said outer ring gear is in a meshing engagement with said annular gear.

* * * * *